United States Patent [19]
Barnickel

[11] Patent Number: 6,052,596
[45] Date of Patent: Apr. 18, 2000

[54] SYSTEM AND METHOD FOR DYNAMIC CHANNEL ASSIGNMENT

[75] Inventor: Donald J. Barnickel, Flemington, N.J.

[73] Assignee: AT&T Corp, New York, N.Y.

[21] Appl. No.: 09/326,650

[22] Filed: Jun. 7, 1999

Related U.S. Application Data

[63] Continuation-in-part of application No. 08/820,513, Mar. 19, 1997.

[51] Int. Cl.$^7$ ........................................... H04Q 7/38

[52] U.S. Cl. ............................... 455/450; 455/62; 455/63; 455/67.1; 455/513

[58] Field of Search ........................ 455/62, 63, 67.1, 455/422, 447, 448, 449, 450, 451, 452, 453, 454, 509, 512, 513, 436; 370/329, 332, 333

[56] References Cited

U.S. PATENT DOCUMENTS

| | | | |
|---|---|---|---|
| 5,134,709 | 7/1992 | Bi et al. | 455/450 |
| 5,335,356 | 8/1994 | Andersson | 455/67.1 |
| 5,752,190 | 5/1998 | Kaewell et al. | 455/436 |
| 5,828,963 | 10/1998 | Grandhi et al. | 455/450 |

*Primary Examiner*—Lee Nguyen

[57] ABSTRACT

A system and method for providing dynamic channel assignments in a microcellular system surrounded by a macrocellular system. The method characterizes the RF environment of the microcellular system and the macrocellular environment. Channels are then ranked according to the signal-to-impairment ratio computed from the measured RF characteristics. A call is assigned to a highest ranked idle channel. All active calls are monitored to ensure voice quality and call performance by forcing hand-off to another channel before degradation occurs. In another embodiment, the system is self-configurable to changes in the macrocellular configuration by including remote power adjustment and remote Supervisory Audio Tone assignment functionality.

29 Claims, 3 Drawing Sheets

LEGEND
→ SERVING SIGNAL
--→ INTERFERENCE

SYSTEM AND METHOD FOR DYNAMIC CHANNEL ASSIGNMENT

This application is a continuation-in-part of U.S. application Ser. No. 08/820,513 filed Mar. 19, 1997.

FIELD OF THE INVENTION

This invention relates to the field of wireless communications systems, and more particularly to the dynamic assignment of transmission channels in a cellular communications network.

BACKGROUND OF THE INVENTION

Indoor wireless access switch systems permit wireless service providers, e.g., paging service carriers and cellular carriers, to provide wireless communications between a microcellular communications system and its surrounding macrocellular communications system. In this framework, the microcellular system generally contemplates an indoor building communications system, where the cells within the microcellular system refer to specific or locaize coverage areas within a macrocellular system. Although considerable progress has been made with the use of wireless technology in microcellular communications systems, for example, indoor systems, many technical problems remain.

One such problem area concerns how cellular communications channels are assigned between the indoor system and the surrounding macrocellular system. Existing implementations of indoor system channel assignment methods focus narrowly on traffic handling capacity, mobile speed and other similar factors. However, prior art systems do not address the issues which are of primary concern to the users of the system, namely, call processing and voice quality. An additional drawback of these methods is that they require information about the macrocellular configuration in order to allocate and assign a channel to the indoor system. As a consequence, prior art systems must be updated each time that a modification is made to the surrounding macrocellular configuration. Another disadvantage of many prior art methods is that they require that a fixed or predetermined radio frequency ("RF") threshold be set prior to initiating channel assignment. Other previously implemented methods have the added drawback of not having autonomous control over the channel assignment methodology and instead, the methodology is initiated and controlled by a Mobile services Switching Center ("MSC").

Accordingly, there is a need for a system and method which can dynamically assign channels with respect to call performance and voice quality.

SUMMARY OF THE INVENTION

In accordance with the present invention, a system and method is provided which dynamically assigns transmission channels in a microcellular communications system with respect to the characteristics of a surrounding macrocellular communications system. The present invention system is an efficient method for dynamically selecting available cellular channels based on call performance and voice quality. One exemplary embodiment of the present invention system utilizes a signal-to-impairment matrix for every transmission channel to advantageously assign the highest performing idle channel to mobile users upon call origination, call termination, and hand-off requests where impairment is defined as the sum of all interfering signals and noise as measured at the received signal channel frequency.

High performance assignment is accomplished in the present invention system by dynamically assessing and characterizing the surrounding RF environment within its own coverage area and the macrocellular environment to make efficient channel assignments for system users. A SAT power level detector is utilized for a real-time signal-to-interference ratio trigger to determine channel assignments. As such, the present invention system requires no knowledge of the surrounding macrocellular configuration. Call performance and voice quality is further assured by monitoring of idle and active calls on the system. Advantageously, the present invention system assigns essentially interference free channels both to originating calls and to calls in progress that have degraded in performance because of extracelullar activity.

Additionally, the present invention advantageously utilizes remote power adjustment and remote Supervisory Audio Tone ("SAT") power assignment to further enhance the quality of the dynamic channel assignment process. This added functionality permits the present invention system to be self-configurable in that call performance can be maintained without actual knowledge of the present or future surrounding macrocellular configuration.

A further advantage of the present invention method is that it operates within an existing call processing architecture. Implementation of the present invention is transparent to and requires no changes to the call processing functionality, and as a consequence, the present invention can be implemented with a user activated on/off feature. As such, the present invention is readily and immediately deployable in existing wireless communications systems.

BRIEF DESCRIPTION OF THE DRAWINGS

A more complete understanding of the present invention may be obtained from consideration of the following description in conjunction with the drawings in which.

DETAILED DESCRIPTION

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIG. 2—may be provided by a single shared processor. (Use of the term "processor" or "controller" should not be construed to refer exclusively to hardware capable of executing software.)

Illustrative embodiments may comprise microprocessor and/or digital signal processor ("DSP") hardware, read-only memory ("ROM") for storing software performing the operations discussed below, and random access memory ("RAM") for storing results. Very large scale integration ("VLSI") hardware embodiments, as well as custom VLSI circuitry in combination with a general purpose DSP circuit, may also be provided.

Although specific values are provided for various parameters throughout the following description, it would be understood that these values are adjustable so that the present invention can operate efficiently in any given environment and are used here only as default values (e.g., see Appendix 1).

A system and method is provided which permits dynamic channel assignments in a microcellular communications system with respect to a surrounding macrocellular communications system. The present invention provides an efficient method for a microcellular communications system to dynamically select available high performance cellular channels within its own coverage area to serve both call origination, call termination and hand-offs. High performance assignment in the present invention system is accomplished by dynamically assessing the surrounding RF environment within its own coverage area and the macrocellular environment to make efficient channel assignments for system users. Additionally, the present invention is self-configurable in that call performance can be maintained without knowledge of the surrounding macrocellular configuration. Furthermore, the present invention is readily deployable in existing wireless communication networks since it operates within an existing call processing architecture.

Figure 1:
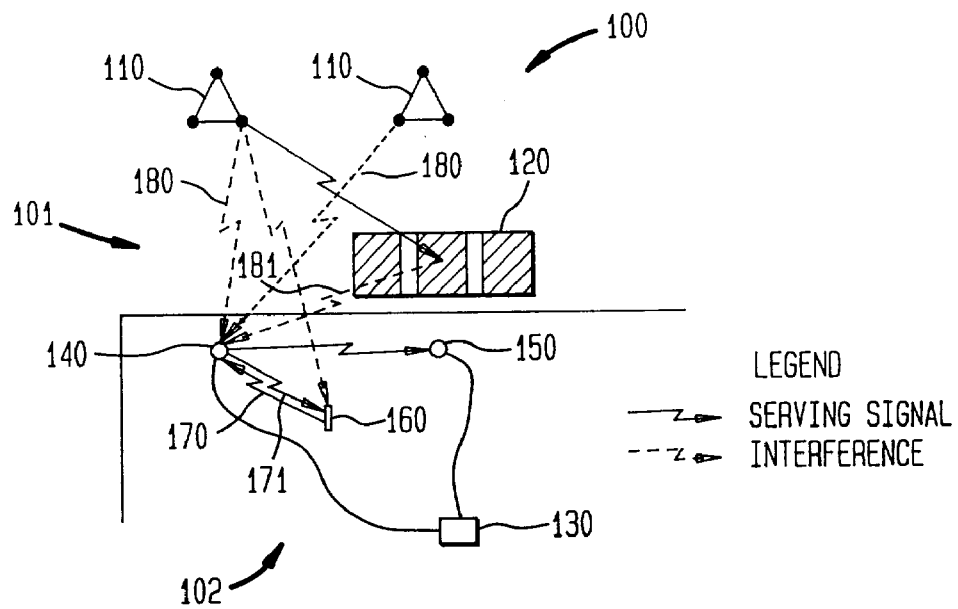
FIG. 1 depicts a communications system having a macrocellular communications system and a microcellular communications system.

Referring to FIG. 1, an exemplary system 100 is depicted wherein the present invention methodology can be advantageously utilized. System 100 depicts a macrocellular communications system 101 which includes macrocells 110 in a communications link with a mobile user 120. A microcellular communications system 102 is shown as an indoor wireless access PBX system ("WAPBX") which includes a controller 130 coupled to a first antenna 140 and a second antenna 150, receiving a downlink serving signal from first antenna 140. First antenna 140 is additionally in a communications link with a handheld unit 160. Although an exemplary embodiment of the present invention references an indoor communications system, it would be understood that the present invention is applicable to any microcellular communications system having a smaller service area within a surrounding macrocellular communications system. In this sense, a microcellular communications system is defined as having at least one cell.

Figure 2:
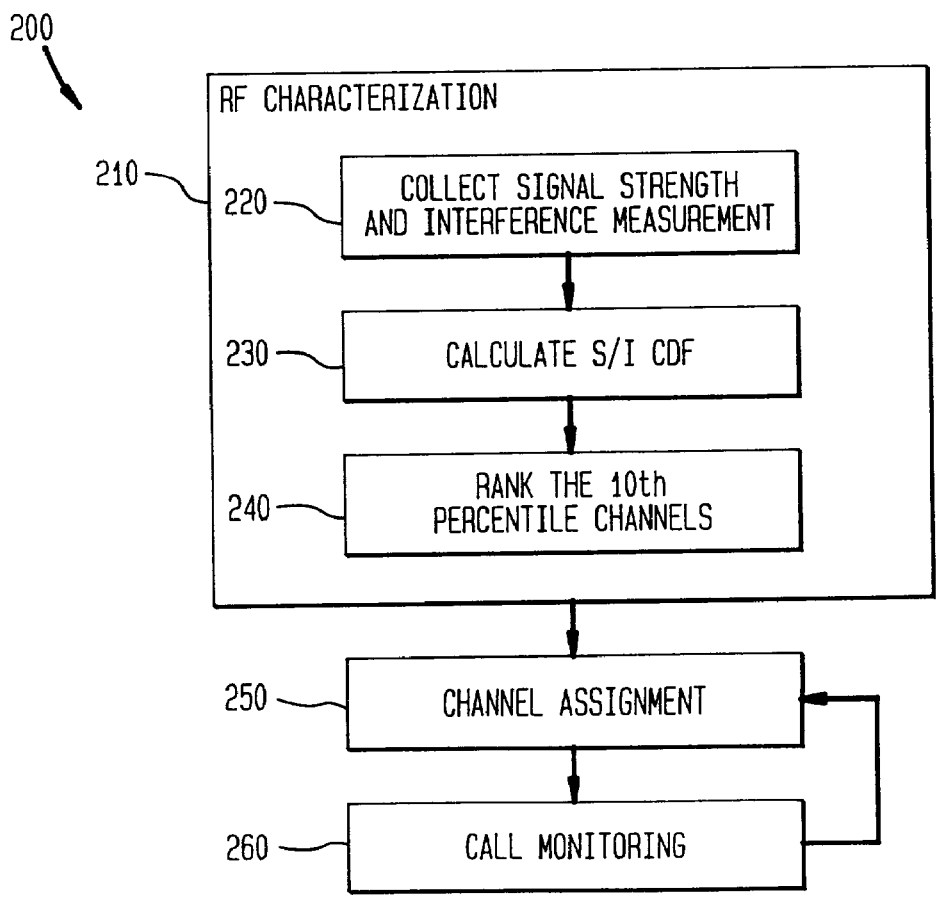
FIG. 2 is an illustrative flowchart for providing dynamic channel assignment in accordance with the present invention.

Referring now also to FIG. 2, there is shown a flowchart 200 depicting a method for dynamically assigning channels in accordance with the present invention. In general, the present invention method consists of three functional steps, RF characterization 210, channel assignment 250, and call monitoring 260. In an exemplary embodiment of the present invention, RF characterization is achieved by having controller 130 collect signal strength measurements on both active and idle channels (block 220). For each idle channel, the measurements are stored in a channel-specific array so that a probability density function ("pdf") can be created for all channels. For active channels, the measurements are stored in one serving-signal array so that a pdf can be created for the server. Since the serving signal measurements are preferably stored in one array, the channel identification is effectively removed. The server represents the logical face or logical cell of WAPBX system 102. The interferers in each channel, for example, represent macrocells 110 or other WAPBX cells. Controller 130 will periodically convolve the serving signal pdf with each channel's pdf to produce a signal-to-impairment ("S/I") pdf for each channel (block 230). The numerator "S" represents the serving signal strength, not a carrier level, the serving signal strength being measured at a receiver. The denominator "I" for impairment represents the power level sum of all interferers on a given channel such as signals received from macrocells 110 or other WAPBX cells plus noise. Impairment as used in the claims refers to the signal strength of an interfering signal (interferer) and another impairing signal, where the another impairing signal may comprise one or multiple interfering signals plus noise. The S/I pdf will be integrated to obtain the cumulative distribution function ("cdf"). From the S/I cdf, the 10th percentile value will be extracted and all channels will then be ranked in descending order by the S/I 10th percentile value (block 240).

Note that in this embodiment, there is a limit to the number of measurements stored for each channel. When the limit is reached, the oldest measurements will be discarded in order to accommodate the newest measurements. In daily operation, the pdfs will vary over time as extracellular activity increases or diminishes in specific sectors of the surrounding macrocells. Not only will this approach follow daily calling patterns, it will allow WAPBX system 102 to adapt to discontinuous RF engineering changes in the macrocellular network.

Controller 130 will then assign the channels top down from the S/I-ranked list so that the first channel assigned will have the best S/I ratio (block 250). Additional separation criteria between channels is not required since adjacent channel performance measures are inherent in the RF characterization. A final signal measurement will be made before the channel is assigned to ensure the channel is interference free. If it is not, then the next available channel in the ranked S/I list is chosen and the assignment is repeated.

In the exemplary embodiment of the present invention, call monitoring is performed for active calls to prevent the call performance from degrading (block 260). In addition to monitoring the signal strength, controller 130 will be able to monitor the Supervisory Audio Tone ("SAT") power for each call. As would be understood, there are three available SATs, one of which is assigned to the system. As explained below, the SATs help a cell receiving a call to identify or distinguish between a serving signal and an interfering signal. Measurements will be taken for all three SATs so that an instantaneous S/I ratio may be determined for the active call. If the SAT S/I ratio falls below a user specified threshold, then controller 130 will force a hand-off to a new channel.

As stated above, RF characterization is accomplished by analyzing signal and interference measurements of the available channels. The serving signal and interference received by WAPBX handheld 160 provides enough information to characterize the forward or downlink performance. These paths are shown in FIG. 1 as first antenna 140-to-handheld unit 160 forward serving signal path 170 and macrocell 110-first antenna 140-to-handheld 160 forward interference paths 180. The reverse or uplink performance is depicted in FIG. 1 as handheld 160-to-first antenna 140 reverse serving signal path 171 and mobile 120-to-first antenna 140 reverse interference path 181. In an exemplary embodiment, a radio, for example a test radio or a voice radio, is used to measure signal strength and interference on active and idle channels.

Figure 3:
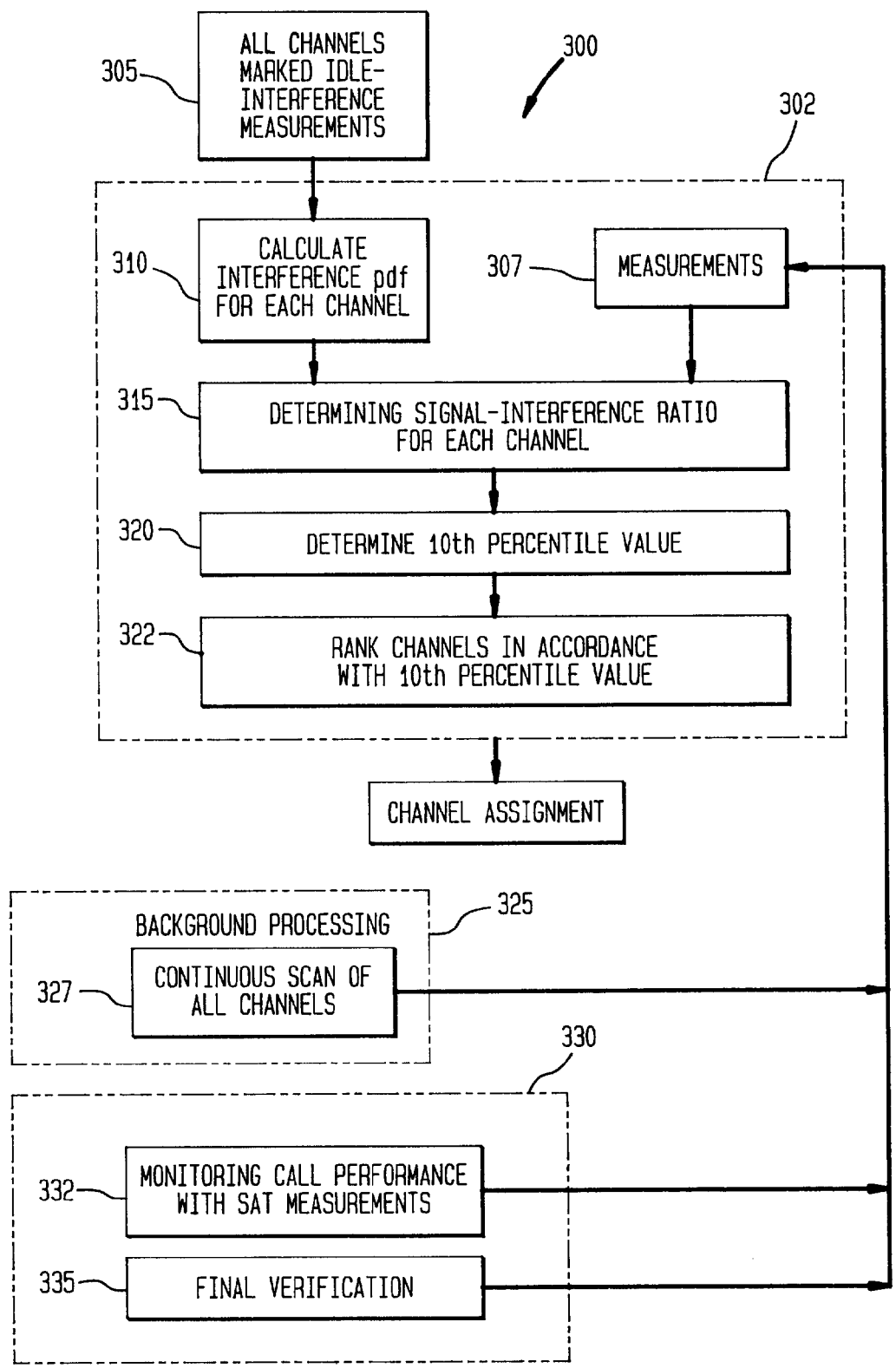
FIG. 3 is an illustrative flowchart for providing RF characterization in accordance with the present invention.

Referring now to FIG. 3, there is shown a flowchart 300 depicting a method for characterizing the RF environment in accordance with the present invention. Note that block 302 represents a set of core functions that are used in the present invention method and for sake of clarity, will be referred to by block 302 instead of the separate functions after the initial explanation. The present invention method requires characterization of the RF environment before channel assignment decisions can be made. As a consequence, controller 130 must collect signal strength measurements on both active and idle channels. On initial system start up, or after any full system initialization, all channels will be marked as idle (block 305). In an exemplary embodiment, controller 130 will scan through the entire channel list, making one 10 ms signal strength measurement per channel (block 305). Measurements can be achieved, for example, by configuring a radio to perform the measurement on an external antenna. The measurements are independent of SAT. In this embodiment, the radio will scan through the channel list 100 times so that 100 measurements are made for each channel. The signal strength values (in dBm) will be stored per channel. After the first 100 measurements have been made for all channels, controller 130 will calculate a 41 point impairment probability density function in 2 dB increments from –40 to –120 dBm (block 310).

In an exemplary embodiment, a pdf is calculated by using a histogram which establishes a frequency count for each signal bin and then each count is normalized to the number of sample points. Since there is no serving-signal information available on start up (as no calls have been made yet), controller 130 will generate a serving-signal pdf based on a log normal distribution using a mean of –90 dBm and a standard deviation of 6 dB (see Appendix 2) (block 312). Similar to the impairment pdf for each channel, the serving-signal pdf will be given in 2 dB steps and range from –40 to –120 dBm.

In one embodiment, controller 130 will then determine the S/I by convolving each impairment pdf with the serving-signal pdf such that $$cdf(k) = \sum_{n=-\infty}^{\infty} pdf_{server}(n) pdf_{interfere}(k-n)$$

The resulting 81 point signal-to-impairment pdf is integrated to form a cumulative distribution function. Since the pdf is discrete, this simply becomes a summation for each element $$cdf(i) = pdf(i) + cdf(i-1)$$

where $cdf(0) = pdf(0)$ (block 315).

Controller 130 will then determine for each S/I distribution, the 10th percentile value by searching through the distribution to determine the two neighboring points and performing a linear interpolation (block 320). The 10th percentile value will be the S/I ratio (in dB) at which 90 percent of the calls will experience this performance level or better.

The S/I 10th percentiles for all channels are then ranked in descending order so that the best performing channels will be assigned first (block 322). Statistically, this should allow controller 130 to assign channels in a nonconsumptive manner, i.e., assigning channels on an available basis as opposed to reserving a set of channels for assignment purposes. As detailed below, the inactivity threshold now becomes an S/I threshold below which no channels will be assigned.

In an alternative embodiment, the convolution of the pdfs can be achieved by assuming that the impairment distributions are approximately log-normal. Using this approach, the pdfs are integrated into cdfs and a least-squares fit is performed on each distribution to determine the slope and intercept. Under the log-normal assumption, the slope and the intercept will yield the mean and standard deviation. The convolution is then simply a subtraction of means and the square root of the sum of the standard deviations squared.

$$\mu_{S/I} = \mu_S - \mu_I$$

$$\sigma_{S/I} = \sqrt{\sigma_S^2 + \sigma_I^2}$$

Furthermore, the 10th percentile value is 1.282 standard deviations away from the resulting S/I mean.

In accordance with the present invention, the system uses signal strength measurements from "foreground" call processing (block 330) and from "background" idle channel monitoring (block 325). Note that no measurement information is discarded by controller 130 without being processed. This creates a statistically valid set of signal strength measurements that track configuration changes in the macrocellular system over time.

After system initialization, controller 130 has characterized the RF environment and is ready to assign channels. In processing calls, controller 130 will continue to make signal strength measurements on both the serving channel and on requested idle channels. However, as a background task to call processing, controller 130 will scan through the entire channel list to continue measuring signal strength on idle channels on a more uniform basis (block 327).

This background measurement process is no different from the initial impairment measurement described previously. In an exemplary embodiment, a radio is configured to measure the signal for 10 ms on an antenna without regard to SAT. A channel is skipped if it is not idle. As in the initial RF characterization, each measurement will be stored by channel.

In processing calls, controller 130 will use the serving voice channel to monitor the received signal strength of each call every 2 seconds (block 332). As detailed below, the measurement must now account for SAT, since SAT will be used to trigger S/I-related hand-offs. Similar to the impairment measurements, the serving-signal measurements will be stored, however, the server's array is independent of channel.

As hand-off requests are processed, controller 130 will perform a final check before assigning a new channel to a call in progress (block 335). In one embodiment, a radio is configured to measure the idle channel's received signal strength from the surrounding macrocellular system to ensure that it is interference free. A 10 ms signal measurement without SAT is performed using the radio on an antenna. As detailed below, if the final channel verification indicates that the channel has become degraded since the last update, the present invention method will select the next best idle channel. This will be repeated until the call is assigned a channel.

In accordance with the present invention method, the signal strength measurement will be stored for each channel. Up to 1000 signal strength measurements will be stored per channel and, when this limit is reached, the oldest measurements will be deleted (i.e., first in, first out) to clear the array for the newest measurements (block 307). Controller 130 will update the S/I matrix by regenerating a new histogram for a channel when the number of new measurements taken since the last histogram was created exceeds 250 (block 302). Controller 130 will determine the impairing pdf, and, using the existing serving-signal pdf, the convolved S/I pdf and the 10th percentile as described previously. The resulting S/I 10th percentile for the channel is then inserted into the previously ranked list of S/I 10th percentiles and the channel's old value is removed.

In the exemplary embodiment, up to 1000 signal strength measurements will be stored for the server and, when this limit is reached, the oldest measurements will be deleted (i.e., first in, first out) to clear the array for the newest measurements. Again, controller 130 will regenerate a new histogram and pdf for the server when the number of new measurements taken since the last histogram was created exceeds 250. The first time the serving-signal pdf is updated, all S/I values will be re-calculated. Recall that the serving-signal pdf was only estimated at start up because no calls were active.

In an exemplary embodiment, a full scan of the entire channel list (395 voice channels) will take less than 10 seconds. The present invention should not impede the operation of controller 130 or a base station. Alternatively, if timing does become a problem, as it might in multi-sector, multi-cell WAPBX systems, a subset of channels can be created so that the controller will scan the higher performing channels more often to update the performance data. In this embodiment, the subset size, for example, could be determined from projected or actual usage and an Erlang B calculation. If subsets are required, a 10-to-1 subset-to-entire set scan ratio is suggested to assure the freshness of the S/I matrix. As would be understood, higher or lower subset-to-entire set ratios can be used.

In a further embodiment, the present invention is applied to multiple sectors and multiple cells. Extension of the present invention method to a multi-sector WAPBX cell (i.e., a cell having multiple sectors) requires characterizing the serving and interfering signal strength for each sector. In an exemplary multiple sector embodiment, it is assumed that the cell operates under the condition that no channel is assigned to two sectors simultaneously. Under these circumstances, it is not necessary to measure sector-to-sector interference. In other words, all interference is assumed to come from the surrounding macrocellular system.

In another embodiment, an exemplary multi-cell WAPBX system permits frequency reuse, where reuse implies simultaneous operation of two voice channels on the same frequency. Alternatively, a WABPX system without reuse can be treated like the multi-sector cell above. Recall that RF characterization was defined above on a channel-by-channel basis, except for the serving signal, which was characterized by sector. For a multi-cell WAPBX system with reuse, the macrocellular-to-WAPBX interference must still be on a channel-by-channel basis since the WAPBX controller has no macrocellular knowledge. However, within the WAPBX system, inter-WAPBX cell interference can be reduced to cell/sector pair combinations, significantly reducing the amount of data required by the present invention system and method. In this embodiment, all signal strength measurements are grouped by sector, not channel. In essence, the controller creates a signal matrix where the off-diagonal elements represent the potential interference for a particular sector pair and the diagonal elements represent the serving signal. As the WAPBX system adds more cells, the controller simply expands the matrix. An S/I value would be determined (as previously described) for each cell/sector pair, so that the controller would not assign a channel to two sectors simultaneously that have S/I ratios below some user-specified threshold. Note that this does not obviate the need for characterizing the interference from the macrocellular system on a channel-by-channel-basis, but it simplifies quantifying this inter-WAPBX interference.

Figure 4:
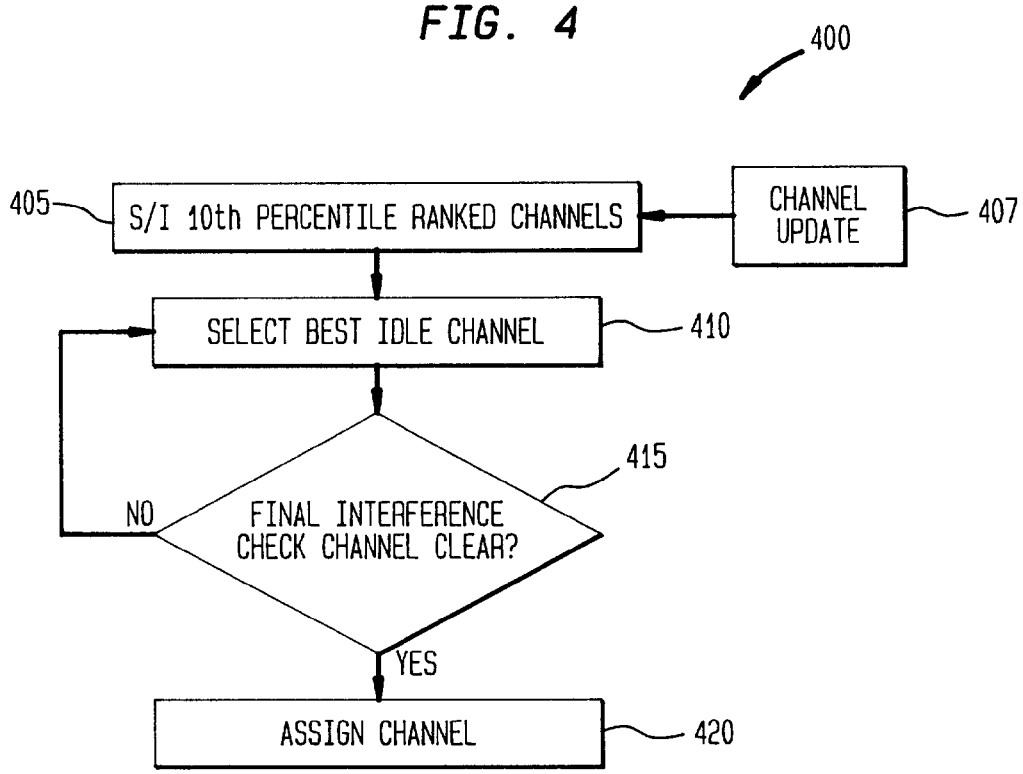
FIG. 4 is an illustrative flowchart for providing channel assignment in accordance with the present invention.

Referring now to FIG. 4, there is shown a flowchart 400 depicting a method for assigning channels in accordance with the present invention. Once the characterization of the RF environment is accomplished, controller 130 will then assign channels from the S/I-ranked channel list starting with the channel that has the best S/I ratio (block 405). As each new request for a channel is initiated, controller 130 will assign the best idle channel (block 410). Controller 130 always starts at the top of the list. As calls are completed on the better-performing channels, these channels again become available so that new requests are initially assigned to a good channel (block 407).

Controller 130 will not assign calls to channels with S/I 10th percentiles less than 17 dB. As would be understood, this ratio value ensures good performance 90% of the time. No additional separation requirements are necessary since in-band adjacent components are already accounted for in the RF characterization for each channel. Statistically the channel will perform well regardless of the source of interference if its S/I ratio is high.

In an exemplary embodiment, controller 130 will make one final signal strength measurement on the selected idle channel before assigning the channel to the call (block 415). This final check provides added protection against an RF environment that has changed significantly since the last characterization. The impairing signal strength should be below the mobile noise floor, which is approximately −116.5 dBm, thus ensuring the channel is impairment free. If it is not, then the next best available channel in the ranked S/I list is chosen and checked. The assignment process is repeated until the call is assigned a channel (block 420). In one embodiment, the final check is performed using a radio configured to measure the received signal for 10 ms on the external antenna without regard to SAT.

Since the RF characterization is based on the premise that all signal and impairment measurements are used to update the S/I matrix, the returned signal strength value is added to the channel's signal strength array. One advantage of the final impairment check is that controller 130 will add more sample points to channels with higher S/I ratios, in effect, to the busier channels. If a busy channel has degraded because the macrocellular configuration has changed, the final impairment check will continue to add new measurements to the channel's signal array even though the channel will not be assigned. As a result, controller 130 will update the channel list sooner than if the channel had been initially characterized as a poor candidate.

In a further embodiment, a service provider will have the option of disabling the final impairment check, thus forcing the present invention method to rely solely on the S/I characterization. The tradeoff for the loss of performance security is the saving of controller 130 time resources, which may be desirable as the WAPBX system increases in size. Alternatively, it can be argued that disabling this option will actually draw more processing time from controller 130 if more calls are set up in a degraded state and trigger S/I-related hand-off requests. However, the signal degradation should not be too severe since the characterization should produce statistically good service.

Figure 5:
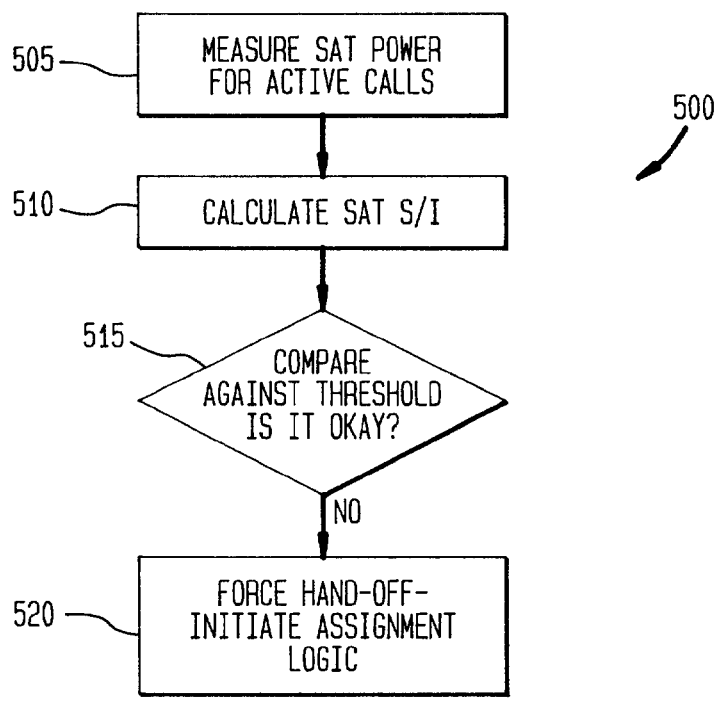
FIG. 5 is an illustrative flowchart for providing call monitoring in accordance with the present invention.

Referring now to FIG. 5, there is shown a flowchart 500 depicting a method for monitoring calls in accordance with the present invention. Call monitoring is performed for active calls to ensure adequate performance. Controller 130 measures the SAT power level after the received signal has been demodulated (block 505). Based on the SAT information, a SAT S/I value is calculated (block 510) and compared against a user-specified SAT S/I trigger ratio (block 515). The default value for the trigger ratio will be 17 dB. If the SAT S/I value is below the threshold, then controller 130 will force a hand-off, thus initiating the channel assignment process described above (block 520).

Frequent call monitoring will result in calls being handed off before poor voice quality becomes noticeable to the subscriber. Under these conditions, the S/I ratio trigger will detect whether a collision is about to take place. In this sense, collision refers to the detection of interference on the channel carrying the serving signal. In one embodiment, a SAT power level detection circuit would be an adjunct to the base station, which would send the SAT power level value back to controller 130.

The signal measurement for monitoring calls was described previously with reference to foreground measurements. After controller 130 has received the SAT power level, SAT POWER, and the SAT frequency, controller 130 then has enough information to calculate an instantaneous SAT S/I value. The SAT modulation index, $\beta$, is known to be ⅓, the radian SAT frequency, $\omega_{SAT}$, is known to be $2\pi \times 5970$ Hz, $2\pi \times 6000$ Hz, or $2\pi \times 6030$ Hz. If the effects of noise are small enough, the value of the average power of the desired signal to the average power of the interfering signal is given by the following equation:

$$S/I = \frac{2 * SATPOWER}{\beta^2 \omega^2 - SATPOWER}$$

If the effects of noise must be accounted for, then a pre-determined level (a constant offset) should be used in the equation above. For the SAT detector circuit to filter the SAT correctly, the radian frequency of the distortion components should be greater than $2\pi \times 90$ Hz.

In an exemplary embodiment of the present invention system, remote power adjustment and remote SAT assignment is required to support a self-configuring system. However, it should noted that the present invention system will work without these features. In these embodiments, it would be necessary to revisit periodically and re-engineer the WAPBX system to accommodate nonfrequency-related changes in the surrounding macrocellular network.

Remote Power Adjustment ("RPA") is required if the control channel signals from the macrocellular system 101 are received at higher levels than the WAPBX control channel signals within the WAPBX environment 102. If this occurs, then WAPBX system 102 will not be able to process call requests because the macrocellular cell will overpower and take control of the internal call. This happens because the control channels used in an IS-20 interface protocol, for example, are the same set for both the macrocellular system and microcellular system. In embodiments which use an IS-94 interface protocol, the additional spectrum allows user handsets to scan the expanded Personal Communications Service ("PCS") control channels before scanning the existing cellular control channels. In these systems, a different control channel is used for the microcellular system. However, as stated above, non-IS-94 handsets will require the present invention RPA.

In accordance with the present invention, RPA allows controller 130 to periodically monitor the control channel signal strength of neighboring macrocells and adjust the indoor power levels accordingly to ensure FM capture. In one embodiment, a radio measures the forward control channel signal on an external antenna. For this configuration, the antennas should be mounted at the perimeter of the building and the control channel power must be set to exceed the measured value, which is either a statistical mean or the 10th percentile. This value may be offset by a constant representing the pathloss difference between the antenna and the handset location. The constant offset, having a default value of 0, is obtained through field measurements when the system is installed. In general, control channel powers in macrocellular systems do not change very often and a comparison twice per day is probably acceptable.

The second feature required for a self-configurable embodiment of the present invention is the remote SAT assignment. Similar to RPA, this feature is not necessary for the dynamic assignment of channels in accordance with the present invention. As stated earlier, SATs assist cells in distinguishing between voice calls and interferers. In general, there are three situations which must be accounted for by the system. First, the system can receive multiple calls on multiple channels, each call using, for example, SAT 1. This is a normal situation and does not represent a problem. Second, the system can receive a voice call with SAT 1 and an interferer with SAT 2. This represents moderate degradation which the cell can correct for by using the different SATs. The third situation is where the voice call and the interferer are both using SAT 1. This is referred to as co-channel, co-SAT interference, which represents a worst-case impairment. Co-SAT neighbors are not a problem with fixed frequency assignments, since neighbors in general, are not also interferers. For WAPBX system 102, however, the co-channel, co-SAT condition is exacerbated by the present invention method since it takes advantage of idle channels assigned to neighboring macrocells. In one embodiment, the present invention method alleviates this problem by selecting the SAT frequency least used by the neighboring macrocells. Therefore, it is necessary to periodically monitor the SAT from the neighboring macrocells. The selection criteria is based on relative SAT power levels provided by the SAT detection. In performing a scan across all channels controller 130 will determine the statistically weakest SAT of the three available and assign that SAT for WAPBX system 102 use.

The SAT characterization is similar to the channel characterization except that not as many sample points are required nor do the values need to be retained after configuration. Since there are not enough sample points for a valid 10th percentile comparison, an average value for each SAT will suffice. The controller will use the SAT with the lowest average. In one embodiment, a radio can be configured to obtain the desired information by measuring a forward voice signal strength with SAT on an external antenna.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

| Description | Default Value |
| --- | --- |
| Initial Number of Signal Measurements per Channel | 100 |
| Serving Signal Mean | −90 |
| Serving Signal Standard Deviation | 6 |
| Foreground Measurement Interval | 2 |
| Total Number of Signal Measurements per Channel | 1000 |

-continued

| Description | Default Value |
|---|---|
| Number of Signal Measurements for Channel Update | 250 |
| Total Number of Signal Measurements per Server | 1000 |
| Number of Signal Measurements for Server Update | 250 |
| Optional Channel Subset Size | 64 |
| Subset-to-Entire Set Scan Ratio | 10 |
| S/I 10th% Channel Assignment Cut-Off Threshold | 17 |
| Interfering Signal Strength on Final Check | −116.5 |
| SAT Trigger Threshold | 17 |
| Pathloss Offset | 0 |

Appendix 2

Generating the Serving Signal Distribution

The serving signal cdf and pdf can be generated using a standardized N(0,1) normal distribution table that is defined on the range of values on the interval [−5,5] in step sizes of 0.01. For explanatory purposes, this table is stored in an array cdf, and it is constructed by the following formula:

$$cdf(n) = \frac{1 + erf\left(\frac{0.01 * i}{\sqrt{2}}\right)}{2}$$

for n and i ∈ [−500,500], where both n and i are integers. An approximation for the error function can be found in most mathematical handbooks.

The 41-point serving-signal distribution $F_s$ is defined on the range [m=−120,−40] dBm in 2 dB steps. For each m, the index norm to the cdf table is calculated as follows:

$$norm = int\left[\frac{m - \mu}{\sigma * 0.01}\right]$$

Here, $\mu$ is set to −90 and $\sigma$ is set to 6 dB.

For each m, $F_s$ is simply the table look-up cdf(norm). The resulting cdf is differentiated to form the pdf. The pdf is discrete, so this simply becomes a subtraction for each element:

pdf(i)=cdf(i)−cdf(i−1)

What is claimed is:

1. A method for assigning channels to a microcellular communications system surrounded by a macrocellular communications system, said method comprising the steps of:
   characterizing a RF environment of the microcellular system and the surrounding macrocellular environment by generating a signal-to-impairment ratio for each channel utilized in said microcellular communication system, said signal-to-impairment ratio comprising a ratio of received signal strength between a serving signal and impairing signals comprising an interfering channel and another impairing signal;
   assigning one of said channels based on signal-to-impairment characteristics of said RF environment; and
   monitoring said channels to ensure call performance by assigning a better performing channel if available from said channels based on updated signal-to-impairment characteristics of said RF environment.

2. The method according to claim 1, wherein said step of generating includes the steps of:
   computing an impairment probability density function from a set of interference signal measurements;
   computing a serving signal probability density function; and
   determining said signal-to-impairment ratio from said serving signal probability density function and said impairment probability density function.

3. The method according to claim 2, wherein said serving signal probability density function is computed using a log normal distribution with a given mean and a given standard deviation.

4. The method according to claim 2, wherein said serving signal probability density function is computed from a set of measurements.

5. The method according to claim 1, wherein:
   said step of characterizing includes the step of ranking a set of available channels based on said generated signal-to-impairment ratio; and
   said step of assigning includes the step of selecting a highest performing available channel from a signal-to-impairment ratio ranked set of channels.

6. The method according to claim 5, wherein said step of assigning further includes:
   making a final impairment measurement on a selected channel before assigning said channel to a call;
   verifying if said measurement is below a given threshold; and
   repeating said steps of making and verifying until said selected channel is above said given threshold and said selected channel is assigned.

7. The method according to claim 1, wherein said step of monitoring includes the steps of:
   calculating a signal-to-impairment ratio from a measured supervisory audio tone power for each active call;
   comparing said signal-to-impairment ratio to a given threshold; and
   requesting a hand-off if said signal-to-impairment ratio is below said given threshold.

8. The method according to claim 7, further including the step of performing a final verification on a hand-off requested channel before completing said hand-off.

9. The method according to claim 1, further including the step of assigning a supervisory audio tone based on a supervisory audio tone characterization of the macrocellular system and the microcellular system.

10. The method according to claim 9, wherein said assigning a supervisory audio tone step includes the steps of:
    measuring power levels of supervisory audio tones used by neighboring macrocells;
    determining a weakest power level supervisory audio tone used by said neighboring macrocells; and
    appointing said weakest supervisory audio tone to the microcellular system.

11. The method according to claim 9, further including the step of adjusting control channel power of the microcellular system.

12. The method according to claim 11, wherein said step of adjusting includes the steps of:
    measuring control channel signal strength of neighboring macrocells in the macrocellular system;

comparing said signal strength to a given threshold; and
increasing power of control channels of the microcellular system if said signal strength is above said threshold.

13. The method according to claim 1, further including the step of adjusting control channel power of the microcellular system.

14. The method according to claim 1 further including the steps of:
making measurements during call processing to update measurements for selected channels having the highest signal-to-impairment ratios;
scanning all of said channels on a given interval of time to update said signal-to-impairment ratio of idle channels; and
updating said signal-to-impairment ratio after a given number of measurements have been received.

15. A system for dynamically assigning channels in a microcellular system surrounded by a macrocellular system, said system comprising:
a radio for collecting signal measurements on each of said channels utilized in said microcellular system, said signal measurements resulting in signal-to-impairment ratio calculations, said signal-to-impairment ratio comprising a ratio of received signal strength between a serving signal and impairing signals comprising an interfering channel and another impairing signal;
a controller operable to characterize a RF environment of the microcellular system and the macrocellular system by using said signal measurements;
said controller further operable to assign one of said channels based on said RF environment characterization to the microcellular system; and
said controller further operable to monitor said channels to ensure call performance by assigning a better performing channel if available from said channels based on updated characteristics of said RF environment.

16. The system according to claim 15, said controller including:
summing means for computing a signal-to-impairment ratio for each of said channels; and
triggering means set at a given threshold for determining a voice quality level of a call.

17. The system according to claim 15, said controller including:
integrating means for computing a signal-to-impairment ratio for each of said channels; and
sorting means for ranking a given set of said channels by said signal-to-impairment ratio so that a highest best idle channel is assigned first.

18. The system according to claim 17, wherein said given set includes said channels having a signal-to-impairment ratio above a given threshold.

19. The system according to claim 17, wherein:
said radio conducts a final signal strength measurement on a selected channel before assigning said selected channel to a call;
said controller verifying that said final measurement is below a given threshold; and
said controller selecting a new channel if said selected channel is above said given threshold.

20. The system according to claim 16, wherein said controller hands-off a call to a new idle channel if said trigger is activated.

21. The system according to claim 20, wherein said controller performs a final verification before completing a hand-off to said new idle channel.

22. The system according to claim 15, said system further including:
detecting means for detecting a power level of supervisory audio tones in neighboring macrocells;
comparator means for determining a weakest power level supervisory audio tone; and
assignment means for appointing said weakest supervisory audio tone to the microcellular system.

23. The system according to claim 22, wherein:
said controller monitors a control channel signal strength of neighboring macrocells;
analyzing means for comparing said control channel signal strength against a given power threshold; and
said controller operable to adjust a power level in the microcellular system if said signal strength is above said given power threshold.

24. An apparatus for dynamically assigning channels in a microcellular system surrounded by a macrocellular system, said apparatus comprising:
a radio for collecting signal measurements on each of said channels utilized in said microcellular system, said signal measurements resulting in signal-to-impairment ratio calculations, said signal-to-impairment ratio comprising a ratio of received signal strength between a serving signal and impairing signals including an interfering channel and another impairing signal;
a controller operable to characterize a RF environment of the microcellular system and the macrocellular system by using said signal measurements;
said controller further operable to assign one of said channels based on said RF environment characterization to the microcellular system; and
said controller further operable to monitor said channels to ensure voice quality by assigning a better performing channel if available from said channels based on updated characteristics of said RF environment.

25. The apparatus according to claim 24, said apparatus further including:
detecting means for detecting a power level of supervisory audio tones in neighboring macrocells;
comparator means for determining a weakest power level supervisory audio tone; and
assignment means for appointing said weakest supervisory audio tone to the microcellular system.

26. The apparatus according to claim 25, wherein:
said controller monitors a control channel signal strength of neighboring macrocells;
analyzing means for comparing said control channel signal strength against a given power threshold; and
said controller operable to adjust a power level in the microcellular system if said signal strength is above said given power threshold.

27. The apparatus according to claim 24, wherein:
said controller monitors a control channel signal strength of neighboring macrocells;
an analyzer for comparing said control channel signal strength against a given power threshold; and
said controller operable to adjust a power level in the microcellular system if said signal strength is above said given power threshold.

28. A system as recited in claim 15, said controller being operable to compute an impairment probability density function from a set of interfering signal measurements, to compute a serving signal probability density function, and to determine signal-to-impairment ratio from said serving signal probability density function and said impairment probability density function.

29. A method for assigning channels to a microcellular communications system surrounded by a macrocellular communications system, said method comprising the steps of:

characterizing a RF environment of the microcellular system and the surrounding macrocellular environment by generating a signal-to-impairment ratio for each of said channels by 1) computing an impairment probability density function from a set of interfering signal measurements, 2) computing a serving signal probability density function and 3) determining said signal-to-impairment ratio from said serving signal probability density function and said impairment probability density function;

ranking said channels by said signal-to-impairment ratio so that a highest performing available channel is assigned first;

assigning one of said channels based on characteristics of said RF environment; and monitoring said channels to ensure call performance by assigning a better performing channel if available from said channels based on updated characteristics of said RF environment.

* * * * *